United States Patent
Hayashi et al.

[11] Patent Number: 6,144,113
[45] Date of Patent: Nov. 7, 2000

[54] MACHINE START CONTROLLING APPARATUS

[75] Inventors: Kazuhiko Hayashi, Aichi-gun; Satoru Matsumoto, Toyota, both of Japan

[73] Assignee: Toyota Jidosha Kabushiki Kaisha, Toyota, Japan

[21] Appl. No.: 09/172,618

[22] Filed: Oct. 15, 1998

Related U.S. Application Data

[63] Continuation of application No. PCT/JP97/01185, Apr. 7, 1997.

[30] Foreign Application Priority Data

Apr. 16, 1996 [JP] Japan ................................. 8-094536
Apr. 16, 1996 [JP] Japan ................................. 8-094538

[51] Int. Cl.$^7$ ................................................. H04L 9/20
[52] U.S. Cl. ..................... 307/10.5; 307/10.4; 180/287; 340/825.31; 340/825.34
[58] Field of Search ................... 307/10.1, 10.4, 307/10.5, 10.3; 180/287; 340/825.31, 825.34, 825.5

[56] References Cited

U.S. PATENT DOCUMENTS

| | | |
|---|---|---|
| 4,749,873 | 6/1988 | Mutoh et al. . |
| 5,555,863 | 9/1996 | Kokubu . |
| 5,670,933 | 9/1997 | Hayashi . |
| 5,708,308 | 1/1998 | Katayama et al. ............ 307/10.5 |
| 5,763,958 | 6/1998 | Yamamoto et al. ........... 307/10.5 |
| 5,790,015 | 8/1998 | Iitsuka .......................... 307/10.4 |
| 5,796,179 | 8/1998 | Honaga ......................... 307/10.5 |

FOREIGN PATENT DOCUMENTS

| | | |
|---|---|---|
| 61-9361 | 1/1986 | Japan . |
| 61-163766 | 10/1986 | Japan . |
| 62-255261 | 11/1987 | Japan . |
| 95603 | 12/1995 | Japan . |
| 8-113114 | 5/1996 | Japan . |
| 8-156746 | 6/1996 | Japan . |
| 8-244558 | 9/1996 | Japan . |
| 8-326638 | 12/1996 | Japan . |

Primary Examiner—Albert W. Paladini
Attorney, Agent, or Firm—Pillsbury Madison & Sutro LLP

[57] ABSTRACT

An immobilizer ECU (20) compares an internally stored reference code with a key code transmitted from a key (10). An engine ECU (24) transmits a rolling code A when an engine speed reaches 500 rpm. The immobilizer ECU (20) transmits a rolling code B when the codes coincide with each other. The engine ECU (24) will stop an engine if it cannot receive the rolling code B within a prescribed period of time. Further, there is provided a counter CIMMOF which is incremented at the beginning of such a process. The counter CIMMOF is reset only when the process is normally completed. If an ignition is turned off prior to transmission and reception of the rolling codes, the counter CIMMOF will be counted up. According to a value of the counter CIMMOF, a period of waiting for the rolling code B is gradually shortened. Further, when the process is completed or a backup power supply to a backup memory (24d) is cut off, a time to transmit and receive the rolling codes is advanced. Thus, the situation where the engine will be able to start due to disconnection of a communication line or the like is prevented.

7 Claims, 6 Drawing Sheets

OVERALL SYSTEM

PROCESS IN THE CASE THAT PREVIOUS START-UP IS NORMAL (1)

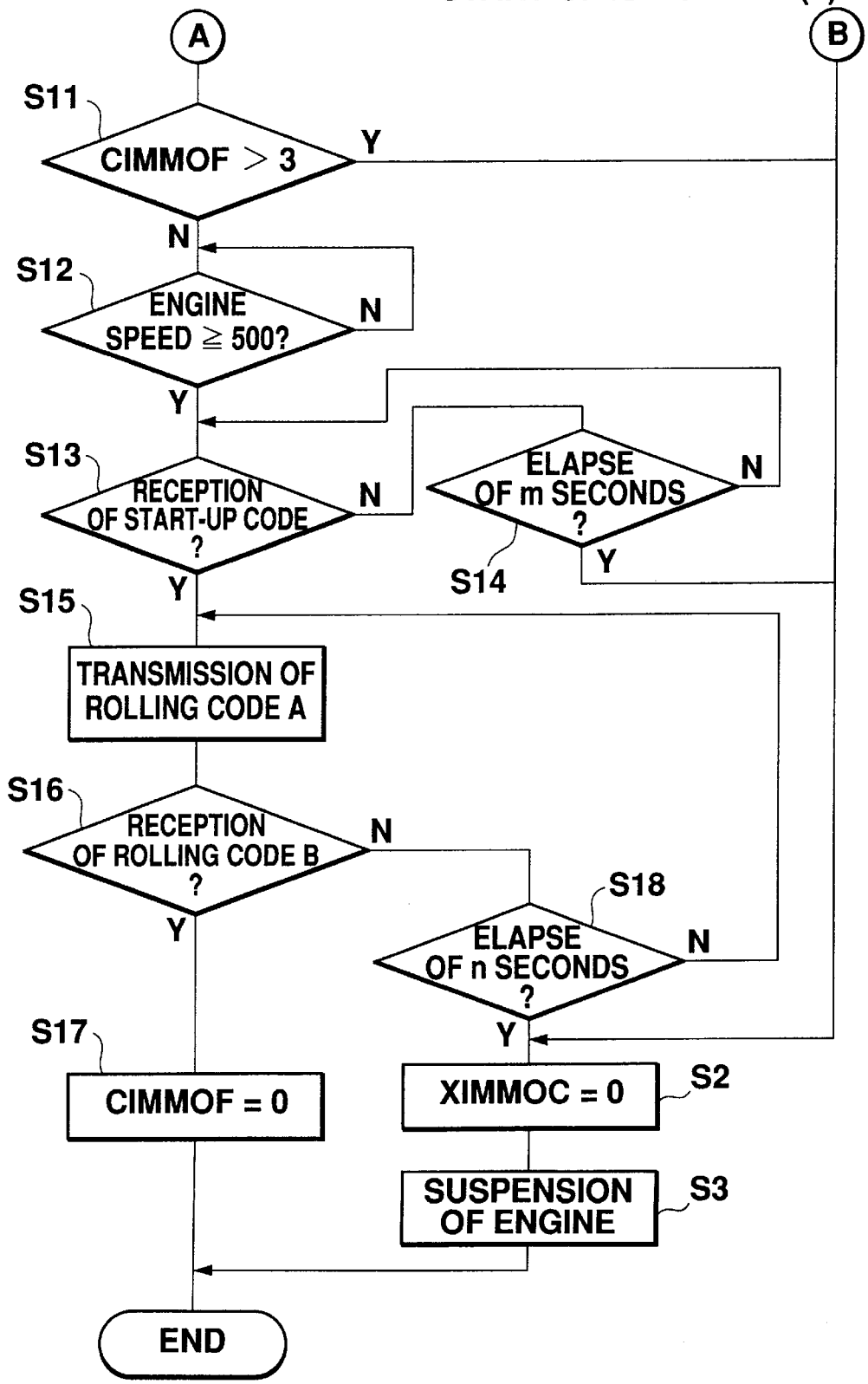
Fig. 5 PROCESS IN THE CASE THAT PREVIOUS START-UP IS NORMAL (2)

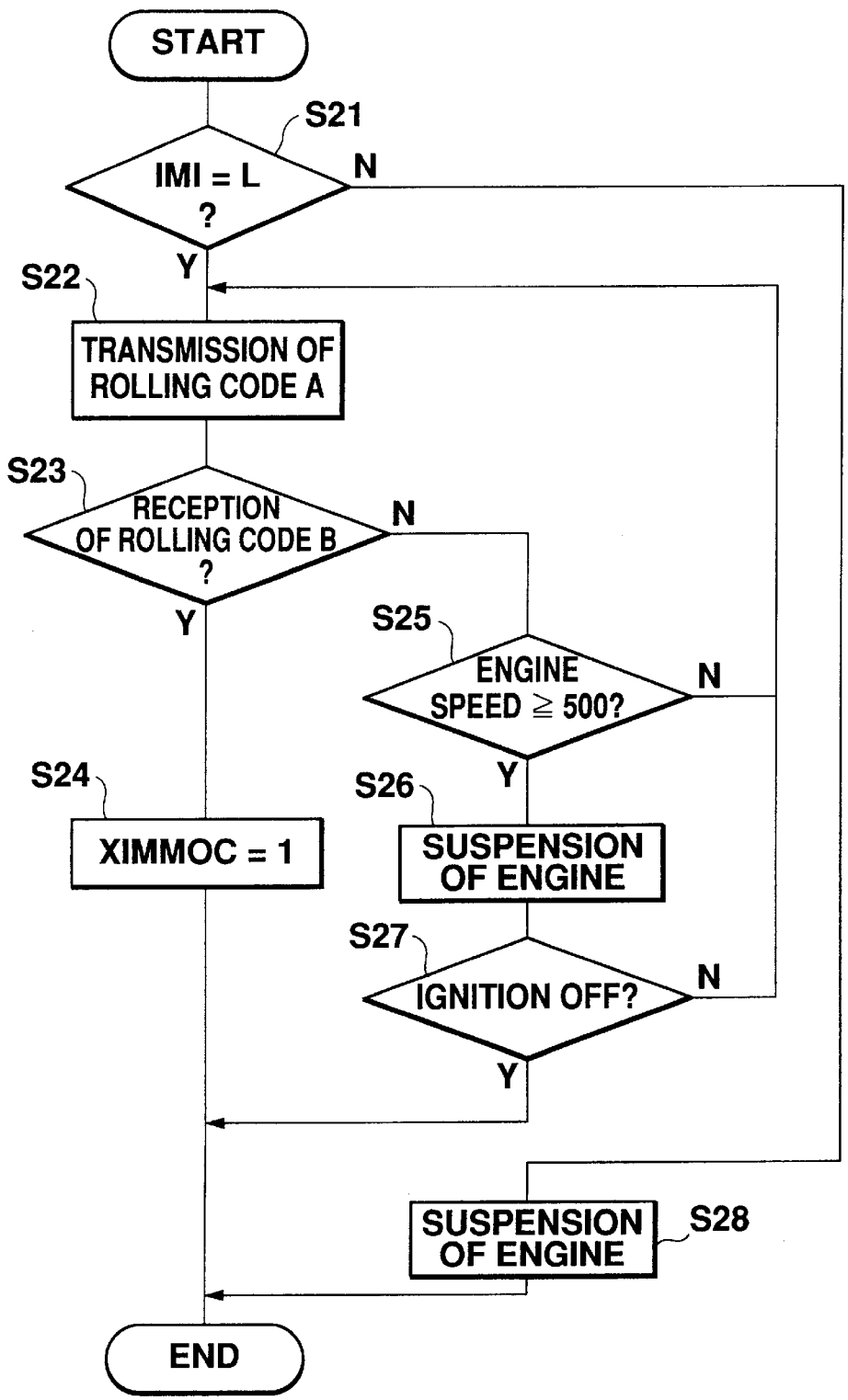

MACHINE START CONTROLLING APPARATUS

This is a Continuation of International Appln. No. PCT/JP97/01185 filed Apr. 7, 1997 which was designated the U.S.

BACKGROUND OF THE INVENTION

1. Field of the Invention

The present invention relates to an equipment start-up control device, and in particular, to a device for stopping start-up of equipment when an improper operation is performed to start up the equipment, such as using a false key or unlawfully changing circuits.

2. Description of the Related Art

In an automobile or the like, locking devices which can be released by a genuine key are fitted to the doors or the like, and the engine can be started only by a genuine ignition key. In such a manner, it is attempted to prevent a vehicle from being stolen. Furthermore, in order to secure the theft prevention, it has been proposed to equip another theft prevention system and such a system is about to be put to practical use.

For example, Automobile Technique Application Publication No. 95603 (Japan Automobile Industry Association, Intellectual Property Section, published on Dec. 1, 1995) disclosed a vehicle theft preventing device which will prohibit start-up of an engine if a genuine ignition key is not used because it is interlocked with an ignition key.

In this vehicle theft preventing device, the ignition key is provided with a built-in transponder for transmitting a key code. An antenna installed in a key cylinder supplies power to the transponder by means radio waves, and the transponder transmits the key code stored. An immobilizer ECU is connected to the antenna in the key cylinder and determines whether or not a key code transmitted is correct. Further, the immobilizer ECU is connected with an engine ECU for controlling ignition of an engine and fuel injection and informs the engine ECU as to whether or not a correct key code has been obtained. If the immobilizer ECU cannot obtain the correct keycode, the engine ECU will prohibit the fuel injection into the engine and the ignition of the engine, thereby controlling the engine to stop. Thus, it is possible to prevent start-up of an engine and travelling of a vehicle when an attempt is made to start the engine without using a genuine key. The engine ECU starts the engine as usual in accordance with ignition which is brought about by operation of the ignition key, and stops the engine in response to a signal transmitted from the immobilizer ECU.

At the initial stage of start-up of the engine, a starter motor is rotated, whereby fluctuation of supply voltage is great. Therefore, communication between the immobilizer ECU and the engine ECU is performed after the engine speed becomes 500 rpm or more.

More specifically, when the engine speed becomes 500 rpm or more, the engine ECU generates a prescribed rolling code A by random number generation and sends it to the immobilizer ECU. If the genuine key has been recognized, the immobilizer ECU will generate a rolling code B by similar random number generation and will send it to the engine ECU in return. Thus, the engine ECU confirms that the genuine key was used. A key confirmation process is then completed, and normal operation of the engine is continued.

On the other hand, if a correct rolling code B is not sent back within a predetermined period of time, the engine ECU will stop the ignition and fuel injection. Thus, if the operation is not executed by using a genuine key, the engine will be stopped.

However, in this conventional example, the engine does not stop for approximately several seconds (for a period of time required to confirm that the rolling code has not been sent back) after the engine speed reaches 500 rpm. Thus, by repeating this operation without using a genuine key, the vehicle travels a certain distance.

There is also an idea that by providing a backup memory inside the engine ECU for storing the number of times the control for stopping the engine at the time of start-up is invoked, if there are several consecutive unusual start-up operations, start-up of the engine will be prevented.

However, there is a problem that if electric power is turned off by, for example, turning off the ignition switch before the engine is stopped by the aforementioned suspension control, the number of times control has been invoked will not be counted any further, unlike the case described above, and therefore travelling of the vehicle will be possible to some extent.

Further, there is another problem that if power supply to the backup memory is cut off, a value of the count up to the previous time will be cleared and therefore travelling of the vehicle will be possible to some extent.

SUMMARY OF THE INVENTION

The present invention is directed to provide an equipment start-up control device which can carry out a sufficient process to stop start-up of equipment even in such an event that electric power is turned off in the middle of the process.

Further, in order to solve the problem described above, the present invention is directed to provide an equipment start-up control device which can carry out a sufficient process to stop travelling of the vehicle even in such an event that power supply to the backup memory is cut off.

The present invention comprises:

code collating means for collating the code of a key inserted into a key cylinder with a reference code stored in storage means; and engine start-up control means, connected with the code collating means, for permitting start-up of equipment when the engine start-up control means can obtain, within a predetermined period of time from the code collating means, a confirmation that the two codes are coincident, prohibiting the start-up of equipment when the engine start-up control means cannot obtain the confirmation, and shortening the aforementioned predetermined period of time when electric power is turned off prior to decision making on permission or prohibition of the aforementioned start-up of equipment.

As described above, according to the present invention, when electric power is cut off before making a decision that the start-up of equipment should be permitted or prohibited, a period of time required for determining whether or not these codes coincide is shortened. Consequently, when the power supply is cut off in the middle of the start-up of equipment, a time period for the start-up of equipment can be shortened. Thus, it is possible to prevent the equipment operating for a certain period of time after cutting off power supply at described timing and repeating start-up operation of the equipment.

Further, another embodiment, the present invention is characterized in that when the aforementioned electric power is periodically turned on and off, the aforementioned start-up of the equipment is prohibited.

In particular, when electric power is periodically turned on and off, there is a good possibility that a source of electric power will be improperly controlled by some tool. In such a case, by prohibiting the equipment from starting, start-up of the equipment which may occur as a result of an improper operation can be effectively prevented.

In another embodiment, the present invention is further characterized in that the aforementioned equipment is an engine and when a key is operated to start the engine, the aforementioned start-up control means awaits a confirmation from the code collating means that two codes are coincident for a predetermined period of time after an engine speed becomes a predetermined value or more.

As described above, by making determination on coincidence of the codes after the engine speed becomes a predetermined value, for example, 500 rpm or more, it is possible to make reliable determination. More specifically, a starter motor is very likely to be rotating when the engine speed is less than 500 rpm. Therefore, there are many cases where the supply voltage is unstable. The determination made at this time will not be accurate. Therefore, more reliable determination can be made if it is done later than this time. Further, when electric power is cut off in the middle of a process to start the equipment, it is possible to gradually shorten a period of time during which the engine speed is 500 rpm or more for the purpose of shortening a period of time required for the determination. Also, by repeatedly turning the ignition on and off, it is possible to effectively prevent the vehicle from travelling a certain distance.

Further, in another embodiment of the present invention, an equipment start-up control device for collating the code of a key inserted in a key cylinder with a reference code stored in storage means and determining whether or not an engine should be permitted to start according to a result of the collation comprises:

a backup memory, connected with a backup power source, for storing data as to whether or not the start-up of the engine has been permitted; and backup power source abnormality detecting means for detecting that power supply to the aforementioned backup memory has been cut off.

The equipment start-up control device is further characterized in that when any abnormality arises in the backup power source, a time to determine whether or not the engine should be permitted to start based on the result of the collation by the aforementioned collating means is advanced.

As described above, when there is any abnormality in the backup power source which supplies power to the backup memory, a time to determine whether or not the start-up of engine should be permitted is advanced. Therefore, a time period of the start-up of engine which takes place according to an improper start-up operation can be shortened. Thus, at the time of such an improper (illegal?) start-up operation which is performed, for example, after removing the battery, the engine can be stopped at an early stage, whereby travelling of the vehicle can be effectively prevented.

Further, in another embodiment, the present invention comprises:

storage means for storing a predetermined reference code;

code collating means for collating, by means of communication, the code of a key inserted into a key cylinder with the reference code stored in the storage means;

engine start-up means, connected with the code collating means through a communication line, for determining whether or not start-up of the engine should be prohibited according to a result of collation which is transmitted through the communication line and controlling the start-up of the engine according to the determination;

engine speed detecting means for detecting that an engine speed has become a prescribed speed; and a backup memory, being backed up by a backup power source, for storing data as to whether or not the previous start-up of the engine was prohibited.

Further, if the previous start-up of the engine was not prohibited, the code collating means will transmit a result of the collation to the engine start-up means when the engine speed becomes a prescribed speed or more. On the other hand, if the previous start-up of the engine was prohibited or any abnormality arises in the backup power source, the code collating means will transmit a result of the collation to the engine start-up means before the engine speed becomes a prescribed speed, whereby a time to determine whether or not the start-up of the engine should be permitted is advanced.

By controlling in such a manner, normally communication between the collating means and the engine start-up means can be performed after the engine speed reaches a prescribed value, for example 500 rpm. Consequently, the determination can be made based on the communication which is performed after completion of driving of a starter motor, whereby it is possible to eliminate the effects of a drop in supply voltage resulting from driving of the starter motor, such as an error.

On the other hand, when start-up of the engine is prohibited or any abnormality arises in the backup power supply, thereby erasing the stored data on the prohibition or permission, a determination on next start-up of the engine is made before the engine speed becomes a prescribed value, for example 500 rpm. By making the determination while the engine speed is below 500 rpm at which a vehicle normally cannot travel, as described above, it is possible to effectively prevent travelling of the vehicle a certain distance which may take place by a plurality of repetitive improper start-up operations or removal of the battery.

Further, in another embodiment, the aforementioned engine start-up means will continue communication with the code collating means for a predetermined period of time even after the process of prohibiting start-up of the engine if a time to make the determination is advanced and will store in the backup memory such data that the start-up of the engine at this time was not prohibited if the code collating means transmit a confirmation that the code of key was correct while the communication is kept on.

If the engine speed is below the prescribed value, there is a relatively high possibility that an error may arise in the communication. Therefore, it is possible to assume that the engine may be stopped in spite of a genuine start-up operation. When the communication is still kept on after the engine has been stopped, if a genuine start-up operation is performed, this will be recognized and determination will be made taking sufficient time in the next operation. Thus, a continuous misconception of genuine operations can be prevented.

BRIEF DESCRIPTION OF THE DRAWINGS

FIG. 5 is a flowchart (2) showing the operation of an embodiment (normal the previous time).

FIG. 6 is a flowchart showing the operation of an embodiment (abnormal the previous time).

PREFERRED EMBODIMENT OF THE PRESENT INVENTION

A preferred embodiment of the present invention (hereinafter referred to as embodiment) will be subsequently described with reference to accompanying drawings.

[Overall constitution of the system]

Figure 1:
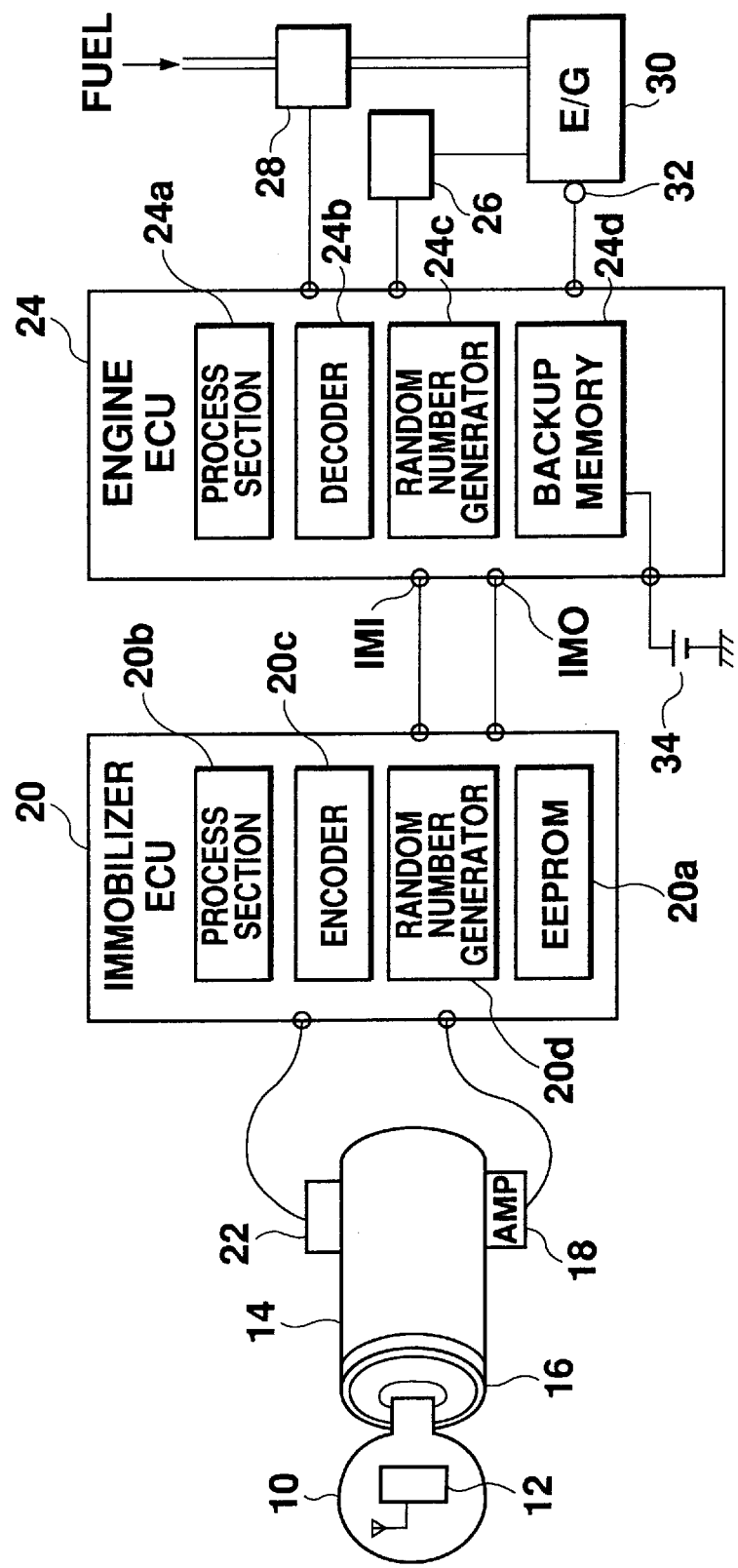
FIG. 1 is a block diagram showing a whole system.

FIG. 1 shows the whole system of an equipment start-up control device in which an equipment start-up control device of this embodiment is utilized. An ignition key 10, which is also used for opening and closing door locks of an automobile, contains a built-in transponder 12. The transponder 12 contains an antenna, a power circuit, a storage section, a readout circuit, a transmission circuit, and the like. When predetermined radio waves comes from outside, the transponder 12 receives the waves by means of the antenna and then supplies it to the power circuit. The power circuit obtains electrical power from the radio waves received and then supplies it to an internal circuit. Then, a code number stored in the storage section is read out and transmitted from the antenna via the transmission circuit.

A key cylinder 14 can be rotated by the ignition key 10 having a prescribed shape (or having prescribed magnetization, etc.). Similarly to an ordinary case, according to the rotating position, various switches, such as an accessory switch, an ignition switch, and a starter switch are operated. More specifically, the accessory switch controls turning on or off of the power supply to accessory equipment, the ignition switch controls turning on or off of the power supply to equipment, such as an ignition plug, which is required for travelling, and the starter switch controls turning on or off of the power supply to a starter motor, respectively. Further, rotation of the key cylinder 14 becomes possible only when a tip of the ignition key 10 inserted fits in with the key cylinder 14.

An antenna 16 is installed around the front side (the side in which the ignition key 10 is inserted) of the key cylinder 14. Predetermined radio waves are transmitted from the antenna 16 to the transponder 12, and radio waves transmitted from the transponder 12 are received by the antenna 16.

An immobilizer ECU 20 is connected to the antenna 16 via an amplifier 18 which amplifies input signals. A key insertion detecting switch 22 is fitted to the key cylinder 14, and the immobilizer ECU 20 is supplied with a signal representing whether or not the ignition key 10 is inserted. Therefore, when the ignition key 10 is inserted, the immobilizer ECU 20 can detect the insertion, and at this time predetermined radio waves are transmitted from the antenna 16, thereby enabling reception of reply radio waves from the transponder 12.

A reference code corresponding to the key code of the ignition key 10 is stored inside the immobilizer ECU 20. In this embodiment, the reference code is stored in an EEPROM 20a. A process section 20b determines through the antenna 16 whether or not the key code transmitted from the transponder 12 coincides with the reference code.

Also, an engine ECU 24 is connected to the immobilizer ECU 20 via a communication line. In the engine ECU 24, a terminal IMI receives signals from the immobilizer ECU 20, and a terminal IMO transmits signals to the immobilizer ECU 20.

The engine ECU 24 controls an ignition (plug ignition) control section 26 and a fuel injection (fuel supply) control section 28. These ignition control section 26 and fuel control section 28 are connected to an engine 30 and control the ignition of the engine and fuel supply, respectively.

More specifically, the engine ECU 24, according to ignition resulting from rotation of the key cylinder 14, creates conditions in which power supply to the ignition plug and fuel supply to the engine can be performed. Further, when the engine 30 is rotated in response to rotation of the starter motor, the engine ECU 24 performs the predetermined ignition and fuel supply and continuously controls the ignition and fuel supply even after the commencement of rotation of the engine 30.

A rotation sensor 32 which is fitted to the engine 30 for detecting its rotating speed is connected to the engine ECU 24, and detects a rotating speed of the engine 30.

An encoder 20c and a random number generator 20d are installed in the immobilizer ECU 20. The encoder 20c generates a start-up code while the immobilizer ECU 20 is operated, and the random number generator 20d generates a predetermined rolling code B. Further, a transmitting and receiving circuit for performing communication through the antenna 16 and a communication interface for performing communication with the engine ECU 24 are installed in the immobilizer ECU 20.

Further, in the ECU 24, a process section 24a, a decoder 24b, a random number generator 24c, and a backup memory 24d are installed. The decoder 24b decodes a start-up code which is sent from the immobilizer ECU 20, and the random number generator 24c generates a predetermined rolling code A. Also, a value of count, a flag, or the like which is required at the time of the next process is stored in the backup memory 24d. Further, the process section 24a performs various processes. A communication interface or the like is also installed in the engine ECU 24, for carrying out communication with the immobilizer ECU.

Further, the backup memory 24d, which always receives power supply from a battery 34, is an SRAM which maintains stored contents. The battery 34 also supplies power for operating various equipment.

[Operation]

Figure 2:
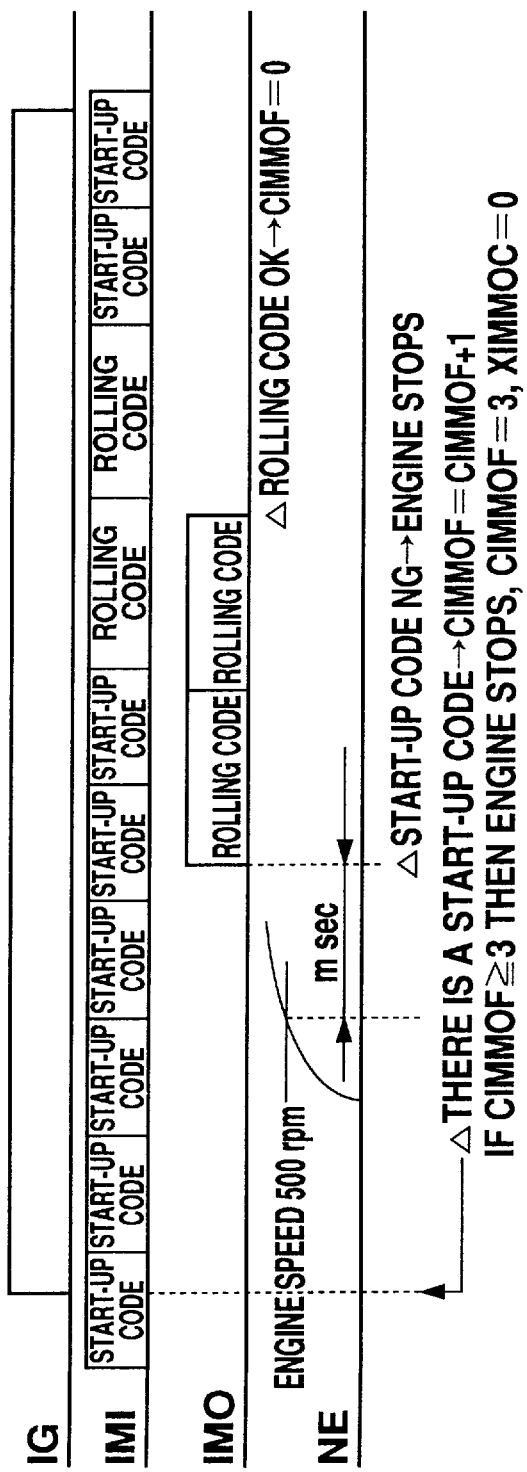
FIG. 2 is a timing chart showing the operation of an embodiment (normal the previous time).
Figure 3:
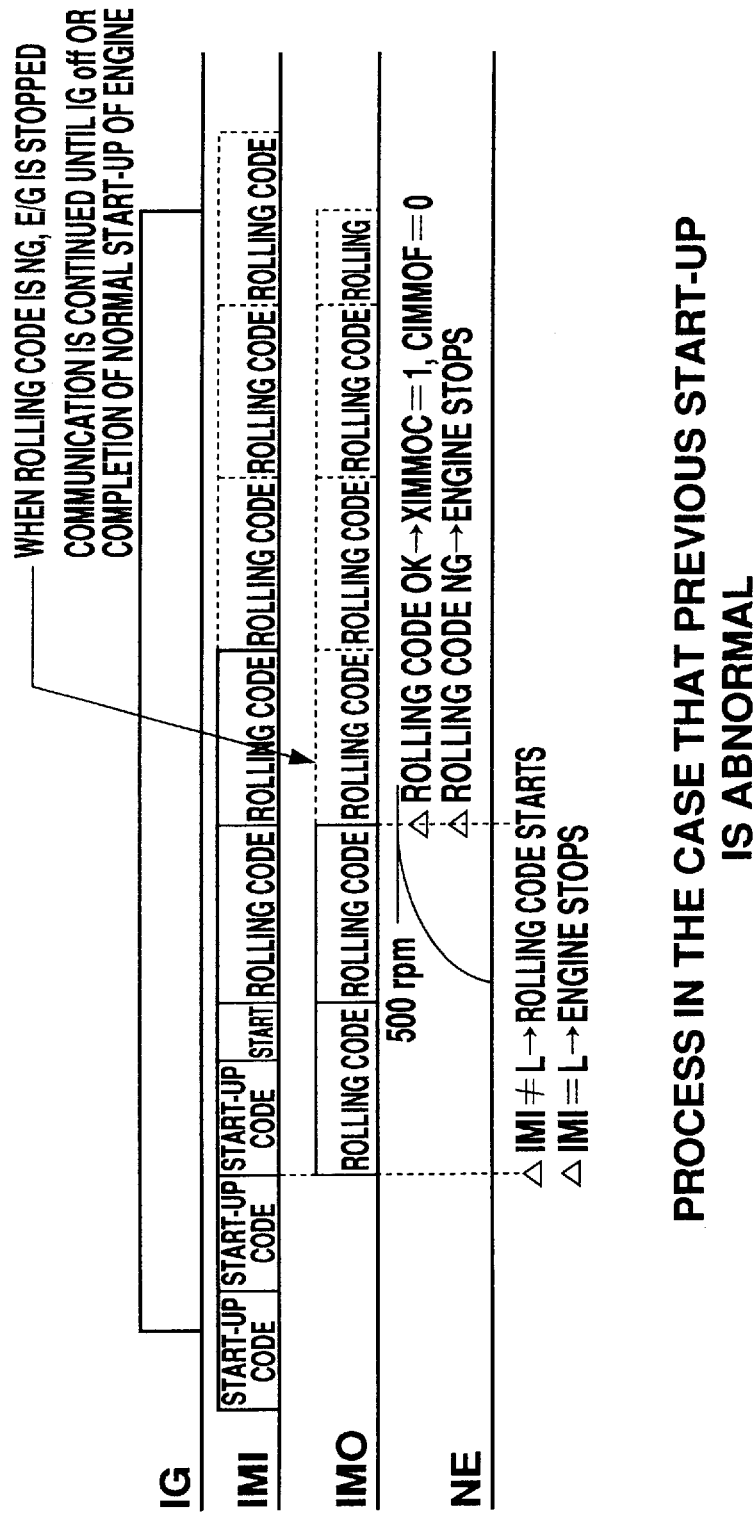
FIG. 3 is a timing chart showing the operation of an embodiment (abnormal the previous time).
Figure 4:
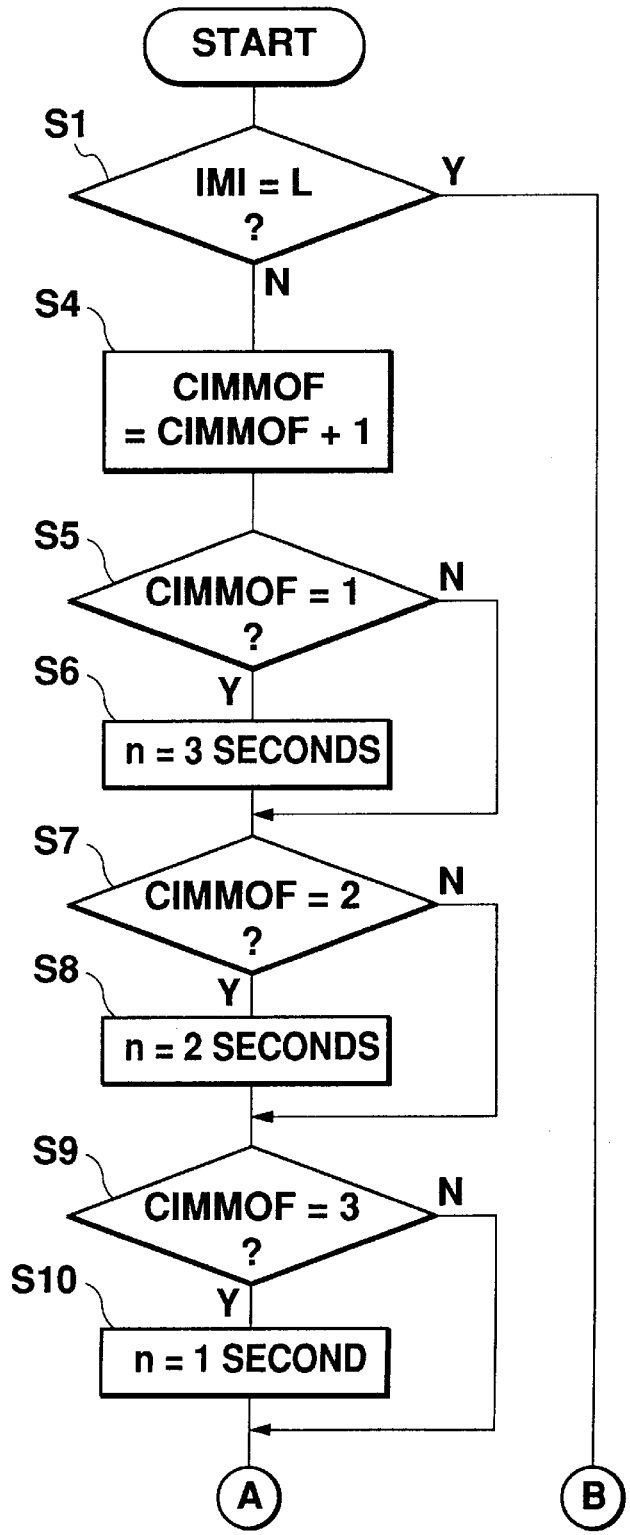
FIG. 4 is a flowchart showing the operation of an embodiment (normal the previous time).

Next, operation of the present system will be described based on timing charts of FIGS. 2 and 3 and flowcharts of FIGS. 4, 5, and 6.

First, when a driver inserts the ignition key 10 into a key way of the key cylinder 14, the key insertion detecting switch 22 detects the insertion and power is turned on, whereby each section starts operating. More specifically, the immobilizer ECU 20 starts transmitting a start-up code to the engine ECU 24 and awaits a signal from the antenna 16 for reception. Further, when receiving the signal from the antenna 16, the immobilizer ECU 20 determines whether or not a key code transmitted from the transponder 12 coincides with the reference code stored in the EEPROM 20a.

In the event that these codes coincide with each other, the immobilizer ECU 20 awaits the rolling code A for reception, sending a start-up code. When receiving the rolling code A, the immobilizer ECU 20 sends the rolling code B in reply. On the other hand, in the event that these codes do not coincide, a communication line for the engine ECU 24 is fixed to L. In the event that the key insertion detecting switch 22 is not installed, it is all right to start operation in response to turning on of the accessory switch or the ignition switch.

In response to turning on of the ignition switch caused by operation of the ignition key 10, the engine ECU 24 creates conditions in which the engine 30 can operate by means of the ignition control section 26 and the fuel injection control section 28. Further, when the starter switch is turned on, the starter motor is turned on. The engine then starts rotating, and ignition and fuel supply are commenced.

[Start-up code]

As described above, in response to turning on of the key insertion detecting switch 22 or the accessory switch, the immobilizer ECU 20 starts operating. A start-up code is then generated in the encoder 20c and transmission of the start-up code is commenced. Thus, as shown in FIG. 2, a start-up code appears at the terminal IMI of the engine ECU 24. The start-up code is repeatedly transmitted by the immobilizer ECU 20. Various means are applicable as the start-up code, such as a cipher code in combination of levels H and L, a PWH (pulse width modulation), and a PSK (position shift keying).

[Flag XIMMOC]

First, the engine ECU determines the value of a flag XIMMOC. The flag XIMMOC is set to zero in the routine which is executed for the first time after the first connection of battery. The flag XIMMOC is also set to zero in the event that there was any error at the time of previous start-up of the engine, and set to one when start-up of the engine is normally completed.

By checking the value of the flag XIMMOC at the beginning of the process in the engine ECU 24, it is determined whether the battery was disconnected once or there was any error at the time of previous start-up. The flag XIMMOC is stored in the backup memory 24d inside the engine ECU 24. Therefore, the value will not be reset as long as the battery is not removed.

[If it was normal the previous time]

First, the case in which the previous start-up of the engine was normal, namely, the value of the flag XIMMOC is one, will be described based on FIGS. 2, 4, and 5.

First, the engine ECU 24 monitors whether or not the terminal IMI, which receives communication from the immobilizer ECU 20 in a state where the ignition switch is turned on, is fixed to L (Step 1). A duration of the terminal IMI being fixed to L is measured using a counter or the like, and when a predetermined value or more is detected, the determination is made. Such determination at Step 1 is always made.

A state of the terminal IMI being fixed to L means that the immobilizer ECU 20 is outputting L. This further means that some improper operation is detected. Therefore, after setting the flag IMMOC to zero (Step 2), the engine is stopped (Step 3).

Thus, if the communication line is set to the L level when mismatch between a key code and a reference code or some improper operation is detected by the immobilizer ECU 20, the engine ECU 24 will detect it judging from the L level of the terminal IMI. Then, the engine 30 will be stopped because the engine ECU 24 prohibits the ignition and fuel injection.

Next, when the H level is detected at the terminal IMI, a fail counter CIMMOF is incremented by one(Step 4). Thus, in this embodiment, the counter CIMMOF, which shows a count for the number of abnormal terminations in the engine start-up process, is counted up at the beginning of process of FIGS. 4 and 5. Therefore, at the time of abnormal termination of the process (halfway), the counter CIMMOF can be counted up. More specifically, when the ignition switch is turned off in the midst of the process, the counter CIMMOF is counted up. Further, the counter CIMMOF is stored in the backup memory 24d.

When the counter CIMMOF is counted up, it is determined whether the counter CIMMOF is one. More specifically, if there has been no error up to the previous time, the counter CIMMOF will be zero. Therefore, by adding one, the counter CIMMOF will be one. In this case, the duration of waiting for receipt of the rolling code B, n seconds, is set to a maximum value, for example three seconds (Step 6). If the counter CIMMOF is two, n will be set to two seconds (Step 7 and Step 8), and if the counter CIMMOF is three, n will be set to one second (Step 9 and Step 10). In this way, by setting n to a smaller value in regular sequence according to the value of the counter CIMMOF, the duration of waiting for the rolling code B in the engine ECU 24 is shortened in the same manner. Thus, travelling of a vehicle due to a repetition of improper use can be less than a predetermined distance.

Then, whether or not the counter CIMMOF is greater than three is determined (Step 11). If it is greater than three, the program will move to Step 2 and Step 3 in which the engine 30 is stopped. Thus, the engine can be stopped at an early stage, and travelling of the vehicle by an improper start-up operation will be impracticable.

If the counter CIMMOF is three or less, it will be determined whether or not an engine speed has reached 500 rpm (Step 12). This determination will be repeatedly performed until the engine speed reaches 500 rpm. When the engine speed reaches 500 rpm, it is determined whether or not the start-up code has been received (Step 13). This detection of the start-up code is repeatedly performed from the beginning of the engine start-up process.

If it is determined at Step 13 that a signal received in the terminal IMI of the engine ECU 24 does not correspond to the start-up code, it will be determined that m seconds (for example, 500 milliseconds) have elapsed since the engine speed reached 500 rpm (Step 14). Then, if the start-up code cannot be received after the elapse of m seconds, the flag XIMMOC will be set to zero (Step 2), and then the engine will be stopped (Step 3).

As described above, by utilizing the start-up code, not only a transmission of the L level from the immobilizer ECU 20, but also a fixation of the terminal IMI to the H level due to disconnection of the communication line can be detected as abnormalities. Also in this case, the engine 30 can be stopped.

On the other hand, if the start-up code is received at Step 13, the engine ECU 24 will transmit the rolling code A to the immobilizer ECU 20 (Step 15). The rolling code A is generated by the random number generator 24c inside the engine ECU 24 in a prescribed method.

By the collation of a key code received with a reference code stored in the EEPROM 20a, the immobilizer ECU 20 has detected the coincidence of these two codes by then. Here, if reception of the rolling code A is confirmed, the immobilizer ECU 20 will produce the rolling code B corresponding to the rolling code A by utilizing the random number generator 20d which is contained in the immobilizer ECU 20 itself. The engine ECU 24 and the random number generation system in the immobilizer ECU 20 are previously arranged so that they correspond to each other. Consequently, the rolling codes A and B generated correspond to each other without fail. Further, the immobilizer ECU 20 transmits the rolling code B to the engine ECU 24. If the key code and the reference code do not coincide with each other, the immobilizer ECU 20 will then set the communication line to the L level. If the engine ECU 24, which is always monitoring conditions of the terminal IMI, detects the L level of the terminal IMI, the engine 30 will be stopped at this point of time.

The engine ECU 24 determines whether or not the rolling code B which corresponds to the rolling code A transmitted by the engine ECU 24 itself is received (Step 16). If the correct rolling code B is received, the counter CIMMOF will be set to zero (Step 17). Then, after the value of the counter CIMMOF is reset to zero, the process will be completed. Thus, the counter CIMMOF is reset to zero only when the process is normally completed.

On the other hand, if a correct rolling code has not been sent back even though the rolling code A was transmitted, this will mean that a normal start-up operation is not performed. In such a case, it will be determined that n seconds have elapsed (S18). Then, the transmission of the rolling code A and the determination on reception of the rolling code B are repeatedly performed for three seconds. If the rolling code B is not received within n seconds, the program will move to Step 12. Then, the flag XIMMOC will be set to zero (Step 2) and the engine 30 will be stopped (S3).

Here, the aforementioned n is any one of the three, two, and one seconds, each of which is set at Step 6, Step 8, and Step 10, respectively. Thus, every time an abnormal termination is brought about during the engine start-up operations which have been performed by then, the duration of waiting the rolling code B will shorten. In particular, since the counter CIMMOF was counted up prior to start-up of the engine as described above, the process of shortening the duration of waiting for the rolling code B will be performed even though the ignition is turned off in the midst of the start-up process.

The detection of a start-up code and the transmission and reception of rolling codes are performed after the engine speed reaches 500 rpm. This is because when the engine speed is 500 rpm or less, there is good possibility that the starter motor is in operation and in this case, supply voltage is unstable, and the probability of an error occurring is high.

As described above, the immobilizer ECU 20 uses not the H level of the communication line, but the start-up code in order to inform the engine ECU 24 that a normal operation is carried out. If the communication line is disconnected, the start-up code will not be transmitted. Then the engine ECU 24 can stop the engine for the reason that the start-up code has not been transmitted. Further, the immobilizer ECU 20 repeatedly transmits the start-up code even after the transmission of the rolling code B. The engine ECU 24 can always confirm connection of the communication line. Also, a restart at the time of an engine breakdown can be facilitated.

A process in a case where there was no error in the previous process, namely, the flag XIMMOC is one, is performed as described above. Also, when any abnormality is detected and therefore the engine 30 is stopped, the flag XIMMOC is set to zero.

[if battery is disconnected or it was abnormal the previous time]

A case after a battery is disconnected and a case which any abnormality was detected in a process at the time of the previous engine start-up (the flag XIMMOC is set to zero in each case) will be described based on FIGS. 3 and 6.

Also in such cases, when detecting any improper operation, the immobilizer ECU 20 sets the communication line for the engine ECU 24 to L. The engine ECU 24 monitors the terminal IMI to determine whether or not the terminal IMI is fixed to L (Step 21). If the terminal IMI is fixed to L, the engine 30 will be stopped (Step 28).

On the other hand, when the engine ECU 24 detects the H level in the terminal IMI, the program immediately enters into a routine for checking rolling codes. More specifically, the engine ECU 24 immediately starts transmission of the rolling code A through the terminal IMO before the engine speed reaches 500 rpm (Step 22). The immobilizer ECU 20 transmits the start-up code as long as it does not detect any improper operation. However, if the immobilizer ECU 20 receives the rolling code A from the engine ECU 24, it will produce the rolling code B corresponding to the rolling code A received, and send it to the engine ECU 24 in reply.

While transmitting the rolling code A through the terminal IMO, the engine ECU 24 monitors conditions of the terminal IMI to determine whether or not the rolling code B is received (Step 23). If the rolling code B can be received, the flag XIMMOC will be set to one (Step 24) and the process will be completed.

On the other hand, if the rolling code B cannot be received, it will be determined whether or not the engine speed has reached 500 rpm (Step 25). Then, the transmission of the rolling code A and the determination on reception of the rolling code B will be repeated until the engine speed reaches 500 rpm. If the rolling code B cannot be detected before the engine speed reaches 500 rpm, the engine will be stopped (Step 26). It is impossible for an ordinary vehicle to travel when its engine speed is 500 rpm or less. Therefore, the process mentioned above enables reliable suspension of travelling of the vehicle.

Further, after the engine 30 is stopped at Step 26, it is determined whether or not the ignition is turned off (Step 27). If the ignition has not been turned off, the program will return to Step 22. Thus, the transmission of the rolling code A by the engine ECU 24 and the transmission of the rolling code B by the immobilizer ECU 20 will be continued until the ignition is turned off. Therefore, the engine ECU 24 can receive the rolling code B even after the engine is stopped. If the rolling code B is received at Step 23, the flag XIMMOC will be reset to one (Step 24). Therefore, the next start-up of the engine can be performed with the flag XIMMOC set to one.

In a process when the flag XIMMOC is set to zero, a value of the counter CIMMOF is not used. Thus, it is preferable to reset the counter CIMMOF to zero at the beginning of the process. Further, it is all right to reset the counter CIMMOF to zero at the time of setting the flag XIMMOC to one.

If the ignition is turned off at Step 27, the process will be completed. Therefore, if the rolling code B cannot be received until the ignition is turned off, the flag XIMMOC will be maintained at zero.

As described above, by carrying out transmission and reception of the rolling codes after the engine is stopped, it is possible to prevent the occurrence of a situation in which the engine cannot be started when no improper operation is performed. More specifically, if the engine speed is below 500 rpm, a communication error will easily arise. Therefore, there will be a case where the transmission and reception of correct rolling codes cannot be performed even when no improper operation is performed. On the other hand, the starter motor is not in operation after the engine is stopped, thereby enabling reliable communication. Thus, it is possible to prevent the situation where the engine cannot be started due to a simple communication error.

As described above, in this embodiment, when power supply to the backup memory 24$d$ is cut off and the stored contents are cleared, transmission and reception of the rolling codes in the next process are performed at an early stage. More specifically, if transmission and reception of the rolling codes are not normally completed before the engine speed reaches 500 rpm, the engine will be stopped. Thus, for example, when a backup power line is cut off, the engine does not reach 500 rpm, whereby reliable suspension of traveling of the vehicle can be achieved. In particular, since the "flag XIMMOC=0" is designated as a value at the time of abnormal start-up, the value of the flag XIMMOC can be easily set when the stored contents are cleared because the power supply is cut off. In other words, by clearing the flag XIMMOC to zero at the time of normal start-up operation, setting of "abnormal start-up the previous time" can be done.

In the embodiment mentioned above, the constitution is such that when a process for stopping the engine is performed by utilizing the flag XIMMOC, transmission and reception of the rolling codes are advanced. However, it is all right not to have such constitution. For example, if it is constituted so that in the process mentioned above, the counter CIMMOF is not reset even though start-up of the engine was abnormal the previous time, the counter CIMMOF will be reset only when a normal start-up is completed. Further, if the counter CIMMOF is counted up when start-up of the engine was abnormal the previous time, it will be possible to change the time of transmission and reception of the rolling codes by utilizing the value of the counter CIMMOF. More specifically, it is also preferable to advance the time of detecting coincidence of the rolling codes in accordance with the value of the counter CIMMOF by counting up the counter CIMMOF at the time of abnormal termination or detection of any improper operation.

Further, according to this embodiment, the backup memory 24d receives power supply from the battery 34 and maintains the contents stored. If the power supply to the backup memory 24d is cut off, the flag XIMMOC will be reset to zero. Therefore, at the time of the next engine start-up, transmission and reception of the rolling codes are performed immediately after the commencement of the process. Thus, it is possible to perform an effective engine suspension process, for example, when the battery is removed.

Further, according to this embodiment, the start-up code is transmitted prior to transmission and reception of the rolling codes. However, the flag XIMMOC functions without having such constitution.

[Possibility of use in the industrial field]

The present invention can be used in a device which is mounted in an automobile or the like to prevent a theft by stopping the start-up of engine when any improper operation is conducted.

What is claimed is:

1. An equipment start-up control device which detects a code of a key inserted in a key cylinder and determines whether or not start-up of an engine should be permitted, said device comprising:
code collating device for collating the code of the key inserted in the key cylinder with a reference code stored in storage device;
start-up control device for permitting start-up of equipment when a result of determination on coincidence of the codes can be obtained from the code collating device within a prescribed period of time, and prohibiting the start-up of equipment when the result of determination cannot be obtained; and
abnormality detecting device for detecting abnormality in said equipment start-up control device,
wherein when the abnormality detecting device detects any abnormality, said prescribed period of time in the collation of the codes is shortened by said start-up control device.

2. The equipment start-up control device according to claim 1, wherein said abnormality detecting device detects that electricity to said equipment start-up control device is cut off prior to the determination by said start-up control device.

3. The equipment start-up control device according to claim 2, wherein when said electricity is periodically turned on and off, said start-up of equipment is prohibited.

4. The equipment start-up control device according to claim 1, wherein said equipment is an engine, and when a key is operated to start the engine, said start-up control device awaits a result of the determination on coincidence of the codes from the code collating device for a prescribed period of time after an engine speed becomes a prescribed value or more.

5. The equipment start-up control device according to claim 1, said device further comprising:
a backup memory, connected with a backup power source, for storing data as to whether or not said start-up control device have permitted the start-up of the engine,
wherein said abnormality detecting device detects that power supply to said backup memory is cut off.

6. An equipment start-up control device comprising:
storage device for storing a prescribed reference code;
code collating device for collating a code of a key inserted in a key cylinder with the reference code by device of communication;
engine start-up device, connected with the code collating device via a communication line, for determining whether or not start-up of an engine should be prohibited according to a result of collation transmitted through the communication line and controlling the start-up of the engine according to the determination;
engine speed detecting device for detecting that an engine speed becomes a prescribed speed; and
a backup memory, being backed up by a backup power source, for storing whether or not previous start-up of the engine was prohibited,
wherein if the previous start-up of the engine was not prohibited, the code collating device will transmit the result of collation to the engine start-up device when the engine speed becomes the prescribed speed or more, and if the previous start-up of the engine was prohibited or any abnormality arises in the backup power source, the code collating device will transmit the result of collation to the engine start-up device before the engine speed reaches the prescribed speed, and a time to make determination as to whether or not the start-up of the engine should be permitted will be changed to become earlier.

7. The equipment start-up control device according to claim 6, wherein if the time to make determination is advanced, said engine start-up device will continue communication with the code collating device for a prescribed period of time after a process of prohibiting the start-up of the engine, and if said engine start-up device receive information that a code of a key is correct which is transmitted from the code collating device during continuation of the communication, data that start-up of the engine at this time is not prohibited will be stored in the backup memory.

* * * * *